3,803,160
2-AMINOALKOXY-4-PHENYL-THIAZOLES SALTS
René Bosshard, Birsfelden, Switzerland, Jean Claude Muller, St. Louis, France, and Edith Ebert, Lorrach, Germany, assignors to Ciba-Geigy Corporation, Ardsley, N.Y.
No Drawing. Filed June 22, 1971, Ser. No. 155,603
Int. Cl. C07d 91/24
U.S. Cl. 260—302 R    2 Claims

ABSTRACT OF THE DISCLOSURE

New 2-aminoalkoxy-4-phenyl-thiazoles corresponding to the formula

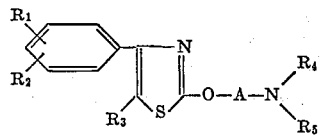

wherein $R_1$ and $R_2$ are independently of each other hydrogen, halogen or lower alkyl,
halogen or lower alkyl,
$R_3$ is hydrogen or halogen,
$R_4$ is hydrogen or lower alkyl,
$R_5$ is lower alkyl,
A is an alkylene binding member as well as their acid addition and quaternary ammonium salts and processes for their production are described. These phenyl thiazoles and their salts are used for controlling the growth of a multitude of plants. They have uses as herbicides, fertilizers, plant hormones and may be used to increase the content of sugar in sugar cane.

The present invention relates to new 2-(aminoalkoxy)-4-phenylthiazoles, to their addition salts with inorganic and organic acids, and quaternary ammonium salts, to processes for the production of these compounds, as well as to agents and processes for the control of plant growth by use of the new thiazoles and their salts.

The new 2-(aminoalkoxy)-4-phenylthiazoles correspond to Formula I:

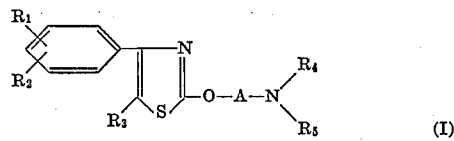

the quaternary ammonium salts to Formula II:

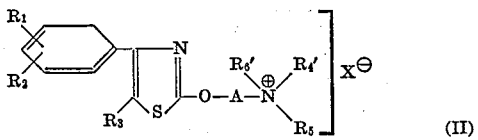

The symbols in these formulae have the following meanings:

$R_1$ and $R_2$ each represent, independently of each other, hydrogen, halogen, or a lower alkyl radical,
$R_3$ represents hydrogen or halogen,
$R_4$ represents hydrogen or a lower alkyl radical,
$R_4'$, $R_5$ and $R_6$ each represent a lower alkyl radical,
A represents an alkylene bridging member, and
X represents the anion of an inorganic or organic acid.

By a lower alkyl radical represented by the symbols $R_1$, $R_2$, $R_4$, $R_4'$, $R_5$ and $R_6$ are meant straight chain or branched radicals having 1–5 carbon atoms, such as, e.g. methyl, ethyl, n-propyl, isopropyl, n-butyl, sec.butyl, iso- butyl, tert.butyl and pentyl, of which are preferred for $R_1$ and $R_2$, as well as for $R_4$, $R_4'$ and $R_5$, the methyl and ethyl radicals. Halogen atoms for $R_1$, $R_2$ and $R_3$ are fluorine, chlorine, bromine. An alkylene bridging-member A contains in all 2 to 6 carbon atoms, of which preferably 2 or 3 carbon atoms are in a straight chain, and can be substituted by methyl and/or ethyl. The symbol X stands for the anion of an inorganic or organic acid; suitable acids are, for example, the following: hydrohalic acids such as hydrochloric acid and hydrobromic acid, phosphoric acid, sulphuric acid, fluoboric acid ($HBF_4$), perchloric acid, alkylsulphuric acids such as methyl- and ethylsulphuric acid, naphthoic acids, benzoic acid, halogenbenzoic acids, acetic acid, halogenacetic acids such as trichloroacetic acid, aminoacetic acid, propionic acid, halogenpropionic acid, butyric acid, lactic acid, stearic acid, aliphatic dicarboxylic acids such as oxalic acid, tartaric acid, maleic acid, etc.

Such acids are likewise suitable for the formation of the addition salts. Preferred for the addition salts are the hydrohalic acids such as hydrochloric and hydrobromic acid, and halogenacetic acids, especially trichloroacetic acid; preferred as quaternary salts are salts of hydrohalic acids, such as the chlorides, bromides, and iodides.

The new 2-(aminoalkoxy)-4-phenylthiazoles of Formula I are obtained according to the present invention by the reaction of a 4-phenylthiazole of Formula III:

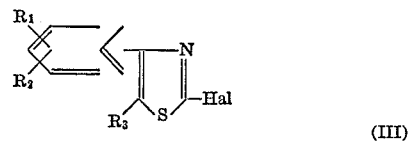

with a compound of Formula IV:

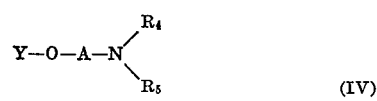

In Formulae III and IV, the symbols $R_1$, $R_2$, $R_3$, $R_4$, $R_5$ and A have the meanings given under Formula I. Hal in Formula III stands for chlorine or bromine, and Y in Formula IV stands for hydrogen or an alkali metal atom.

The process according to the invention is preferably carried out in the presence of a solvent or diluent, for which purpose is used, in the first place, an aminoalkanol of Formula IV. Also suitable are ketones, aliphatic and aromatic hydrocarbons and halogenated hydrocarbons, N,N-dialkylated amides, etc. The reaction temperatures are in the range of 0 to 150° C., preferably between 20 and 100° C.

The new quaternary ammonium salts of Formula II are obtained according to the present invention by quaternating a 2-(aminoalkoxy)-4-phenylthiazole of Formula Ia:

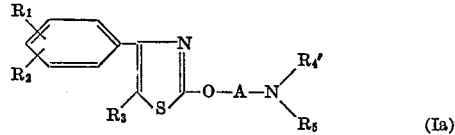

with a compound of Formula V:

$$R_6-Z \qquad (V)$$

and, optionally, reacting the thus obtained quaternary salts, to effect an exchange of the anion of a possibly phytotoxic acid, with other nonphytotoxic inorganic or organic acids. In the Formulae Ia and V, the symbols $R_1$ to $R_6$ and A have the meanings given under Formulae I and II. The symbol Z denotes a halogen atom, an alkoxysulphonyloxy- or arylsulphonyloxy group.

It is advantageous to perform quaternization in the presence of a solvent or diluent inert to the reactants, such as an aromatic hydrocarbon, e.g. benzene, toluene, or an xylene; a chlorinated aromatic hydrocarbon, e.g. chlorobenzene; an N-alkylated acid amide such as dimethylformamide, nitriles; an ether, and suchlike. The reaction temperatures are between 50° and 150° C. The reaction durations are between 15 minutes and 24 hours, and are dependent essentially on the reactivity of the reactants, and on the solvent used.

Suitable quaternating agents of the General Formula V are alkylhalides, dialkylsulphates, toluenesulphonic acid alkyl esters, etc., whereby the alkylhalides are preferred. The halogen ion of the obtained quaternary ammonium halide can be easily exchanged for the anion of any desired nonphytotoxic inorganic or organic acid, (a) by subsequent neutralization with the corresponding acid, and
(b) by an anion-exchanging synthetic resin.

The following examples describe the production of the new thiazoles of Formula I, their addition salts, and the quaternary ammonium salts of Formula II. Further thiazoles, addition salts, and quaternary ammonium salts, which are produced by the process described in the examples, are listed in the following table.

The temperatures are given in degrees centigrade.

EXAMPLE 1

(a) To a dimethylaminoethanolate solution (5 g. of sodium are dissolved under nitrogen in 350 ml. of dimethylaminoethanol) are added 46 g. of 2-chloro-4-(4'-chlorophenyl)-thiazole, and the whole is stirred overnight at 90°–100°. Water is subsequently added to the reaction mixture; the reaction mixture is then extracted with ether, the ethereal solution washed neutral with water, dried over sodium sulphate, and concentrated by evaporation. After vacuum distillation are obtained 14.3 g. of 2-($\beta$-dimethylaminoethoxy) - 4 - (4'-chlorophenyl) - thiazole, B.P./0.02 torr: 145–147°.

(b) An amount of 2.5 g. of a 25% ethereal hydrochloric acid solution is added to a solution of 4.5 g. of 2-($\beta$-dimethylaminoethoxy)-4-(4'-chlorophenyl) - thiazole in 25 ml. of absolute ethanol. The solution is cooled in an ice bath; to the solution are then added 50 ml. of absolute ether, and the solution is thereupon filtered. After recrystallization from ethanol/ether 2:3 are obtained 3.1 g. of 2-($\beta$-dimethylaminoethoxy)-4-(4'-chlorophenyl)-thiazole hydrochloride, M.P.: 160–162°.

EXAMPLE 2

To a solution of 2.4 g. of 2-($\beta$-dimethylaminoethoxy)-4-phenylthiazole (B.P./0.4 torr: 135°–136°) in 250 ml. of ether are added dropwise, at −10°, 8.5 g. of methyl iodide. The mixture is stirred overnight at room temperature, and then filtered. After recrystallization from ethanol are obtained 9.7 g. of $\beta$-[4-phenylthiazolyl(2)-oxy)]-ethyl-trimethyl-ammonium iodide, M.P. 163°–165°.

| Compound: | Melting point/boiling point |
|---|---|
| $\beta$-[4 - phenyl - thiazolyl(2) - oxy]-ethyl - trimethyl - ammonium-iodide | 163–165°. |
| $\beta$-[4 - phenyl - thiazolyl(2) - oxy]-ethyl - diethyl-methyl-ammonium-iodide | 211–213°. |
| 2 - ($\beta$ - dimethylamino-ethoxy) - 4-phenyl - thiazolehydrochloride | 184°. |
| 2 - ($\beta$-ethylamino-ethoxy)-4-phenyl-thiazole hydrochloride | 170°. |
| $\beta$-[4 - phenyl - thiazolyl(2) - oxy]-$\alpha$-methyl - ethyl-trimethylammoniumiodide | 205–207°. |
| 2 - ($\alpha$ - methyl - $\beta$ - dimethylaminoethoxy) - 4 - phenyl thiazole hydrochloride | 170°. |
| $\beta$-[4 - phenyl - thiazolyl(2) - oxy]-$\beta$ - dimethyl - ethyl-trimethylammonium-iodide | 233–235°. |
| $\beta$-[4 - phenyl - thiazolyl(2) - oxy]-propyl - trimethylammonium - iodide | 190°. |
| 2 - ($\gamma$ - dimethylamino-propoxy) - 4-phenyl-thiazole hydrochloride | 180°. |
| $\beta$-[4 - (4'chlorophenyl)-thiazoyl(2)-oxyl]-ethyl - trimethylammonium-iodide | 189–192°. |
| $\beta$-[4 - (4'chlorophenyl)-thiazoyl(2)-oxy] - ethyl - diethyl - methylammonium-iodide | 222–223°. |
| 2 - ($\beta$ - dimethylamino-ethoxy) - 4-(4' - chlorophenyl) - thiazole-hydrochloride | 172–174°. |
| 2 - ($\beta$ - ethylamino-ethoxy) - 4 - (4'-chlorophenyl)-thiazole hydrochloride | 168°. |
| $\beta$ - [4-(4' - chlorophenyl)-5-bromothiazolyl(2) - oxy] - ethyl-trimethylammonium iodide | 194–195°. |
| 2 - ($\beta$ - dimethylamino-ethoxy)-4-(4' - chlorophenyl) - 5 - bromo-thiazole-hydrochloride | 180–183°. |
| 2-($\alpha$ - dimethylamino-ethoxy)-4-(2',4'-dichlorophenyl) - thiazole - hydrochloride | 173–173.5°. |
| $\beta$ - [4 - (3',4' - dichlorophenyl)-thiazolyl(2)oxy] - ethyl - trimethylamonium-iodide | 215–216°. |
| 2 - ($\beta$ - dimethylamino-ethoxy) - 4-(3',4' - dichlorophenyl) - thiazole hydrochloride | 181.5–183.5°. |
| $\beta$ - [4 - (3',4' - dichlorophenyl) - 5-bromothiazolyl(2) - oxy] - ethyl-trimethylammonium-iodide | 195–196°. |
| 2 - ($\beta$ - dimethylamino-ethoxy) - 4-3',4'-dichlorophenyl) - 5 - bromo-thiazole hydrochloride | 179–180°. |
| 2 - ($\beta$ - dimethylamino-ethoxy) - 4-(2' - chloro - 4' - methylphenyl)-thiazole hydrochloride | 149.5–152°. |
| 2 - ($\beta$ - dimethylamino-ethoxy) - 4-phenyl-thiazole | 135°/0.2 torr. |
| 2 - ($\beta$-diethylamino-ethoxy)-4-phenyl-thiazole | 145°/0.3 torr. |
| 2 - ($\beta$-methylamino-ethoxy)-4-phenyl-thiazole | 76–77°. |
| 2 - ($\beta$-ethylamino-ethoxy)-4-phenyl-thiazole | 157°/0.05 torr. |
| 2 - ($\alpha$ - methyl - $\beta$ - dimethylamino-ethoxy) - 4 - phenyl-thiazole | 133°/0.4 torr. |
| 2 - ($\beta$ - dimethyl-$\beta$-dimethylamino-ethoxy) - 4 - phenyl-thiazole | 143°/0.01 torr. |
| 2 - ($\gamma$ - dimethylamino-propoxy)-4-phenyl-thiazole | 139°/0.2 torr. |
| 2 - ($\beta$-diethylamino) - 4 - (4'-chlorophenyl)thiazole | 145°/0.03 torr. |
| 2 - ($\beta$-methylamino) - 4 - (4'-chlorophenyl)-thiazole | 74–75°. |
| 2 - ($\beta$-ethylamino) - 4 - (4'-chlorophenyl)-thiazole | 172°/0.01 torr. |
| 2 - ($\beta$ - methylamino-ethoxy)-4-(4'-chlorophenyl)-thiazole hydrochloride | 189–192°. |
| 2 - ($\beta$ - ethylamino-ethoxy) - 4 -phenyl-thiazole trichloroacetate | 69–71°. |
| 2 - ($\beta$ - ethylamino-ethoxy) - 4 - (4'-chlorophenyl) - thiazole trichloroacetate | 91–93°. |

The new 2-(aminoalkoxy) - 4 - phenylthiazoles of Formula I and their salts are excellent growth-control agents for the most diverse varieties of plants. These active substances promote in a varying manner the growth of parts of plants above and below the ground, are not phytotoxic the values obtained in the case of fifteen untreated plants (control), these being rated as 0 which denotes 100%.

| | Gathered after 4 weeks, percent | | Gathered after 5 weeks, percent | |
|---|---|---|---|---|
| Active substance | Increase of sugar content, polarimeter | Increase in purity of the pressed out juice | Increase of sugar content, polarimeter | Increase in purity of the pressed out juice |
| 2-(β-dimethylamino-ethyoxy)-4-(3',4'-dichlorophenyl)-thiazole-hydrochloride | 44.7 | 18.5 | 31.0 | 15.5 |
| | 27.9 | 8.0 | 16.7 | 7.5 |
| Control | 0 | 0 | 0 | 0 | when applied in the usual concentrations, and produce no morphological changes or damage which would result in the withering of the plants. Furthermore, the compounds are not mutagenic. Their action is different from that of a herbicidal active substance, a fertilizer, and a plant hormone.

The active substances according to the invention are distinguished, in particular, in that they effect an increase of nutrient storage in vegetative parts of plants. Of special importance are the active substances according to the invention and their salts for the treatment of sugar cane, where they bring about an increase of the sugar content, with improved ripening. Moreover, they promote rooting, the formation of tubers, the development of strong stalk material, and intensified branching, etc.

Some effect also an increase of fruit setting, and an acceleration of the ripening process, combined with an increase in crop yield. Others reduce growth in height in the case of various grasses, e.g. lawn grasses, varieties of millet, etc.

The degree of effectiveness depends, amongst other things, on the time and manner of application, as well as on the amounts applied. These three factors vary, however, depending on the type of plant and on the desired effect. Thus, for example, lawns will be treated during the whole of the growth period; decorative plants, of which, for example, the intensity and number of blossoms are to be increased, before the formation of blossom setting; and plants of which the fruit is to be used or sold will be treated immediately after blossoming, or at an appropriate interval before picking.

The active substances are applied in the form of solid and liquid agents both to the plants and into or onto the ground. For application onto the plants, aqueous solutions or dispersions are most suitable. For the treatment of the ground it is possible to use dusts, granulates, scattering agents, and also aqueous solutions or dispersions.

For the widening of the sphere of action, these agents can contain other growth-control agents, e.g. from the range of phosphorus esters.

The following tests illustrate the effect of the active substances according to the invention on the vegetative storage organs of various plants.

(1) APPLICATION TO SUGAR CANE

In the case of each active substance, fifteen 21 to 24 month old sugar cane plants are treated with an aqueous or acetonic solution of the active substance. The solution is applied into the leaf-spindles of the plants; 38 mg. of active substance are applied to each plant. This amount corresponds to an applied concentration of 3.5 kg. per hectare. The plants are gathered after 4 or 5 weeks. In order to establish the effectiveness of the active substance, the purity of the pressed-out juice with regard to sugar content compared with other organic constituents is determined by the so-called press-method developed by T. Tanimoto (cp. Hawaiian Planters' Record, vol. 57, p. 133, 1964). The sugar content is also measured polarimetrically. In the following tables are given the values obtained in these tests. Serving as a reference basis are As a comparison was used the dimethylammonium salt of 2,3,6-trichlorobenzoic acid, known under the trade name of "Trysben®" (cp. U.S. Pat. No. 3,245,775). It gave the following values.

Gathered after 4 weeks:
  Percent sugar content (polarimetr.) _____ +18.7
  Percent purity of the pressed out juice ____ +4.8
Gathered after 5 weeks:
  Percent sugar content (polarimetr.) _____ +19.49
  Percent purity of the pressed out juice ____ +4.28

(2) APPLICATION TO GRASSES

A lawn-grass mixture consisting of Lolium perenne (20%), Poa pratensis (23%), Agrostis tenuis (10%) and Festuca rubra (47%) is cultivated for 4 months in seed trays, and the grass cut once each week. The freshly cut lawn-grass about 1.5 cm. in height is then treated with aqueous or aqueous-acetonic active substance solutions. The lawn-grass is subsequently maintained at 25°, 65% relative humidity under 15,000 lux. The growth in height is assessed 4 weeks after application of the active substances.

In the following table is given the reduction in percent in the growth in height produced by the active substance in the case of different applied amounts.

| | Reduction in growth in height in percent | |
|---|---|---|
| Compound | 10 kg./ha. | 5 kg./ha. |
| 2-(β-dimethylaminoethoxy)-4-(2'-chloro-4'-methylphenyl)-thiazole hydrochloride | 10 | |
| β-4-(3',4'-dichlorophenyl)-thiazolyl(2)-oxy)-ethyl-trimethylammonium-iodide | 10 | 10 |

Note.—100% = Untreated lawn-grass.

Herbicidal agents according to the invention are produced in a manner known per se by the intimate mixing and grinding of active substances of the General Formula I with suitable carriers, optionally with the addition of dispersing agents or solvents which are inert to the active substances. The active substances can be obtained and used in the following forms.

solid preparations: dusts, scattering agents, granulates (coated granulates, impregnated granulates and homogeneous granulates);
water-dispersible concentrates of the active substance: wettable powders, pastes, emulsions;
liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline-earth silicates, sodium and potassium aluminium silicates (feldspar and mica), calcium and magnesium sulphates, magnesium oxide, ground synthetic materials, fertilizers such as ammonium sulphate, ammonium phosphates, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm.; for scattering agents from about 0.075 mm. to 0.2 mm.; and for granulates 0.2 mm. or coarser.

The concentrations of active substance in the solid preparation forms are from 0.5 to 80%.

To these mixtures may also be added additives stabilizing the active substance, and/or non-ionic, anionactive, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olefin/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, ligninsulphonic acids, their alkali metal and alkaline-earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e. wettable powders, pastes and emulsion concentrates, are agents which can be diluted with water to obtain any desired concentration. They consist of active substance, carrier, optionally additives which stabilize the active substance, surface-active substances, and anti-foam agents and, optionally, solvents. The concentration of active substance in these agents is 5 to 80%.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkalimetal and alkaline-earth metal salts.

Suitable anti-foam agents are, for example, silicones.

The active substances are so mixed, ground, sieved and strained with the above-mentioned additives that the solid constituent in the case of wettable powders has a particle size not exceeding 0.02 to 0.04 mm., and in the case of pastes not exceeding 0.03 mm. For the preparation of emulsion concentrates and pastes are used dispersing agents such as those mentioned in the preceding paragraphs, organic solvents, and water. Suitable solvents are, e.g. the following: alcohols, benzene, xylenes, toluene, dimethylsulphoxide, and mineral oil fractions boiling in the range of 120 to 350°. The solvents must be practically odorless, non-phytotoxic, inert to the active substances, and not readily inflammable.

Furthermore, the agents according to the invention can be used in the form of solutions. For this purpose, the active substance (or several active substances) is (or are) dissolved in suitable organic solvents, mixtures of solvents, or water. As organic solvents it is possible to use aliphatic and aromatic hydrocarbons, their chlorinated derivatives, alkylnaphthalenes, mineral oils on their own or in admixture with each other. The solutions should contain the active substances in a concentration of from 1 to 20%.

To the described agents according to the invention may be added other biocidal active substances or agents. For the widening of their sphere of action, the new agents can contain, in addition to the stated compounds of the General Formula I, e.g. insecticides, fungicides, bactericides, fungistatics, bacteriostatics or nematocides. The agents according to the invention may also contain fertilizers, trace elements, etc.

In the following are described preparations of the new active substances of the General Formulae I and II. The term "parts" denotes parts by weight.

GRANULATE

The following substances are used for the preparation of a 5% granulate:

| | Parts |
|---|---|
| 2 - ($\beta$-dimethylaminoethoxy)-4-(2'-chloro-4'-methylphenyl)-thiazole hydrochloride | 5 |
| Epichlorhydrin | 0.25 |
| Cetyl polyglycol ether | 0.25 |
| Polyethylene glycol | 3.50 |
| Kaolin (particle size 0.3–0.8 mm.) | 91 |

The active substance is mixed with epichlorhydrin and the mixture dissolved in 6 parts of actone; to the solution are thereupon added polyethylene glycol and cetyl polyglycol ether. The thus obtained solution is sprayed on to kaolin, and the acetone then evaporated off in vacuo.

WETTABLE POWDER

The following constituents are used for the preparation of (a) a 50%, (b) a 25%, and (c) a 10% wettable powder:

(a)

| | Parts |
|---|---|
| $\beta$ - [4 - phenylthiazolyl(2)-oxy]-ethyldiethylmethyl ammonium iodide | 50 |
| Sodium dibutylnaphthalene sulphonate | 5 |
| Naphthalenesulphonic acid/formaledhyde/conden-formaldehyde condensate 3:2:1 | 3 |
| Kaolin | 20 |
| Champagne chalk | 22 |

(b)

| | Parts |
|---|---|
| 2 - ($\beta$ - ethylaminoethoxy) - 4-(4'-chlorophenyl)-thiazole hydrochloride | 25 |
| Sodium aluminum silicate | 10 |
| Sodium dibutylnaphthylsulphonate | 0.6 |
| Naphthalenesulphonic acid/formaldehyde/condensate 3:2:1 | 1.0 |
| Kaolin | 63.4 |

(c)

| | Parts |
|---|---|
| 2 - ($\beta$ - dimethylaminoethoxy) - 4-(3',4'-dichlorophenyl)-5-bromothiazole hydrochloride | 10 |
| Mixture of the sodium salts of saturated fatty alcohol sulphates | 3 |
| Naphthalene sulphonic acid/formaldehyde/condensate | 5 |
| Kaolin | 82 |

The stated active substance is absorbed onto the appropriate carriers (kaolin and chalk), and thew hole subsequently mixed and ground. Wettable powders having excellent wettability and suspension properties are thus obtained. From such wettable powders can be obtained, by dilution with water, suspensions of any desired concentration of active substance. Such suspensions are suitable for the treatment of sugar cane.

PASTE

The following substances are used for the preparation of a 45% paste:

| | Parts |
|---|---|
| β - [4 - (3',4'-dichlorophenyl)-thiazolyl (2)-oxy]-ethyl-trimethylammonium iodide | 45 |
| Sodium aluminum silicate | 5 |
| Cetyl polyglycol ether having 8 moles of ethylene oxide | 14 |
| Oleylpolyglycol ether having 8 moles of ethylene oxide | 1 |
| Spinndle oil | 2 |
| Polyethylene glycol | 10 |
| Water | 23 |

The active substance is intimately mixed and ground, in suitable devices, with the additives. A paste is thus obtained from which can be produced, by dilution with water, suspensions of an desired concentration. These suspensions are suitable for the treatment of lawns.

EMULSION CONCENTRATE

The following ingedients are mixed together for the preparation of a 10% emulsion concentrate:

| | Parts |
|---|---|
| 2 - (β - dimethylaminoethoxy) - 4-(3',4'-dichlorophenyl)-thiazole hydrochloride | 10 |
| Oleylpolyglycol ether having 8 moles of ethylene oxide | 15 |
| Isophorone | 75 |

This concentrate can be diluted with water to obtain emulsions of suitable concentrations. Such emulsions are suitable, e.g. for application on sugar cane.

What is claimed is:

1. 2 - (β - dimethylamino - ethoxy) - 4-(3',4'-dichlorophenyl)-thiazole hydrochloride.

2. β - [4 - (3',4' - dichlorophenyl)-thiazolyl-(2)-oxy-ethyltrimethylammonium iodide.

References Cited

Dahlbom: Chem. Abstracts, 48'2687–8 (1954).

RICHARD J. GALLAGHER, Primary Examiner

U.S. Cl. X.R.

71—90